(12) United States Patent
Sternowski

(10) Patent No.: US 9,397,722 B1
(45) Date of Patent: Jul. 19, 2016

(54) SINGLE FEED DISTRIBUTED ANTENNA SYSTEM

(71) Applicant: Softronics, Ltd., Marion, IA (US)

(72) Inventor: Robert H. Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

(21) Appl. No.: 14/548,450

(22) Filed: Nov. 20, 2014

Related U.S. Application Data

(60) Provisional application No. 61/947,047, filed on Mar. 3, 2014.

(51) Int. Cl.
| H04B 1/48 | (2006.01) |
| H04B 1/44 | (2006.01) |
| H04W 88/08 | (2009.01) |

(52) U.S. Cl.
CPC .. *H04B 1/48* (2013.01); *H04B 1/44* (2013.01); *H04W 88/085* (2013.01)

(58) Field of Classification Search
CPC ..... H04W 24/00; H04W 24/08; H04W 52/52; H04W 84/042; H04W 16/14; H04W 16/18; H04W 16/24; H04W 24/06; H04W 36/08; H04W 40/02; H04W 52/08; H04W 52/225; H04W 52/30; H04W 52/36
USPC .......................................................... 455/78
See application file for complete search history.

(56) References Cited

U.S. PATENT DOCUMENTS

| 4,740,794 | A | * | 4/1988 | Phillips | H04B 1/40 343/702 |
| 5,461,349 | A | * | 10/1995 | Simons | H04N 7/104 333/109 |
| 5,471,146 | A | * | 11/1995 | Krayeski | H04B 17/318 324/637 |
| 5,586,167 | A | | 12/1996 | Handforth | |
| 6,252,507 | B1 | | 6/2001 | Gagnon | |
| 7,522,045 | B2 | | 4/2009 | Cutler et al. | |
| 7,525,487 | B2 | | 4/2009 | Burnside et al. | |
| 7,684,776 | B2 | * | 3/2010 | Nation | H01Q 1/242 455/273 |
| 2007/0055147 | A1 | * | 3/2007 | Dalzell | A61L 31/18 600/431 |
| 2011/0008042 | A1 | * | 1/2011 | Stewart | H04B 10/25753 398/42 |

OTHER PUBLICATIONS

Sternowski—U.S. Appl. No. 13/898,906, filed May 21, 2013.

* cited by examiner

*Primary Examiner* — Ajibola Akinyemi
(74) *Attorney, Agent, or Firm* — Jason R. Sytsma; Shuttleworth & Ingersoll, PLC

(57) ABSTRACT

A radio system provides multi-antenna coverage of an area in an efficient and affordable manner. The radio system includes a base radio to transmit and communicate with and through multiple antennas spaced throughout a substantially radio opaque structure through a single transmission line. The base radio has an antenna port that connects the base radio to a transmission line. Several directional couplers are spaced in line with the transmission line corresponding with the areas where antenna coverage is needed.

19 Claims, 1 Drawing Sheet

SINGLE FEED DISTRIBUTED ANTENNA SYSTEM

This application claims priority to U.S. Provisional Application No. 61/947,047 filed Mar. 3, 2014, the entirety of which is hereby incorporated by reference herein.

This disclosure relates generally to connecting multiple spatially-separated radio antennas, and more specifically relates to a single feed distributed antenna system.

BACKGROUND

Where there are radio-opaque areas where communication is required, a separate antenna will be used in each. Each antenna will be connected either to a separate radio for that particular coverage space, or to a transmission line which is routed to a radio in a central location. At that central location, the transmission line can be summed or divided (for receiving or transmission, respectively) to a common radio, or switched among other similar antennas to a single radio. In either event, it is not possible to simultaneously communicate with any antenna in the system, and there is a great deal of expensive transmission line required (and which must be installed throughout the building) to connect each antenna separately, and a means of summing or switching the antennas among one or more radios is required.

Prior art has attempted to maintain communications in such scenarios by the use of "leaky feeder" transmission line, which is a coaxial cable into which radiating slots have been cut to cause the transmission line to function as a series of slotted antennas. Unfortunately, this has several drawbacks. The pattern is controlled by the rotational position of the cable, which is difficult to control during installation and use. The antenna gain is poor, meaning that it is inefficient in receiving and transmitting. The slot can generally be tuned to only one narrow frequency, making it limited in coverage for a given cable. The diameter of the cable has to be relatively large to support its use as a VHF or UHF slot antenna, according to the physics of the antenna design. Thus leaky feeders have not enjoyed wide use in solving the multi-antenna coverage problem.

This disclosure teaches a solution for overcoming the problems of the leaky feeder approach and provides multi-antenna coverage of an area in an efficient and affordably manner.

SUMMARY

Disclosed is a radio system that provides multi-antenna coverage of an area in an efficient and affordable manner. The radio system includes a base radio to transmit and communicate with and through multiple antennas spaced throughout a substantially radio opaque structure. The base radio has an antenna port that connects the base radio to a transmission line. Several directional couplers are spaced in line with the transmission line corresponding with the areas where antenna coverage is needed.

Each directional coupler has an input port and an output port that position the directional coupler in line with the transmission line. An antenna port is provided to connect the antenna to the directional coupler. The directional coupler is characterized with a high loss ratio (100:1 to 1000:1) from the tap port for the antenna and the output port of the directional coupler to prevent signals received by the antenna from traveling downstream away from the base station, and a low loss between the input port and the tap port to provide a signal from the base station to each of the antennas. In such a manner, the base radio can communicate simultaneously with all of the antennas or receive signals from any antenna in the radio system.

In another embodiment, a method for establishing communication with a base radio in a structure is disclosed. A base station is provided in a substantially radio-opaque structure. A transmission line is run from the base station to two or more locations where direct communication with the base radio is desired. A directional coupler is positioned in line with the transmission line in each of the two or more locations. The directional coupler includes a tap port for an antenna that can communicate with the base station. The directional coupler limits communication between each of the antennas in the method by isolating the tap port and the output port.

DETAILED DESCRIPTION OF THE FIGURES

Figure 1:
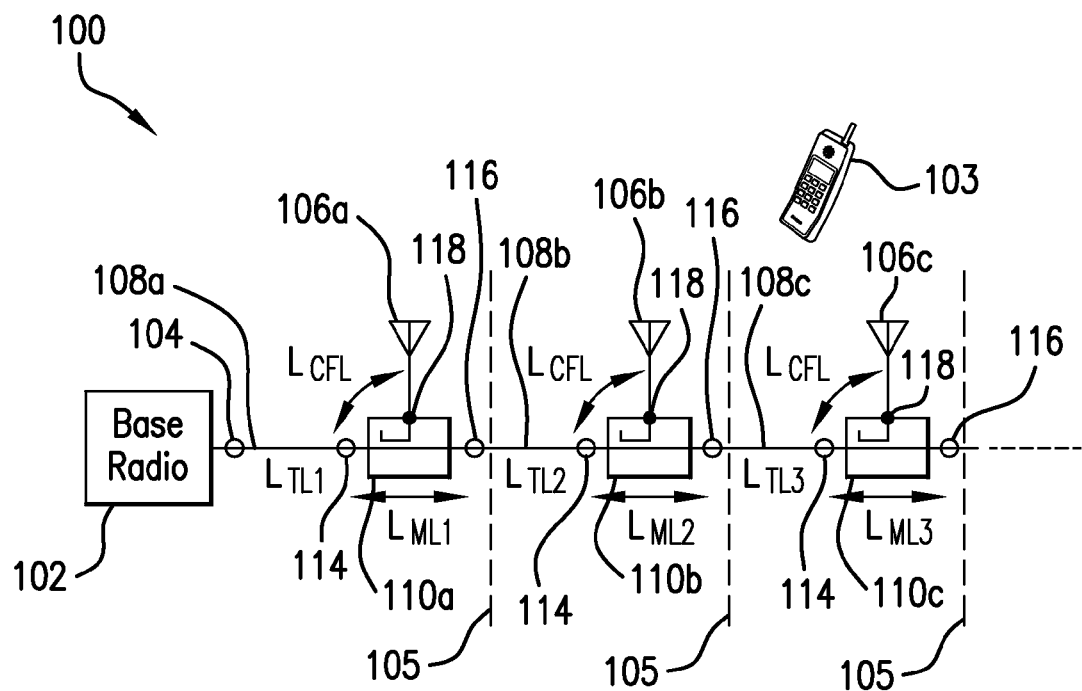
FIG. 1 shows a radio system according to this disclosure.

FIG. 1 shows a radio system 100 according to this disclosure. Radio system 100 includes a base radio 102 with an antenna port 104 for communicating by transmission or receiving with one or more antennas 106a, 106b, 106c, etc. Base radio 100 as used in this disclosure is intended to be construed as broadly as possible to include a radio signal transmitter, receiver or both (often referred to as a transceiver) for any range or band of frequencies. Mobile device 103 is any communication device capable of communicating with base radio 102.

Radio System 100 is particularly useful in a building where one antenna 106a, 106b, 106c, etc. is located in each floor or in each room of a radio-opaque structure 105 which is an area where direct communication with base radio 102 is substantially limited. A user of mobile device 103 on any floor or in any of the equipped rooms may communicate with base radio 102 via whichever of antennas 106a, 106b, 106c, etc. is in range and visible to the mobile device 103. FIG. 1 shows radio-opaque structure 105 as a dashed line for illustration purposes only; in practice, however, radio-opaque structure 105 can surround base station 102 and each antenna 106 to isolate each other from direct radio communication.

A transmission line 108 connects each antenna 106 through a corresponding directional coupler 110. Transmission line 108 can be divided into portions that extending between ports on directional coupler 110. A first transmission line portion 108a connects an antenna port 104 on base radio 102 with a first directional coupler 110a. A second transmission line portion 108b connects first directional coupler 110a with a second directional coupler 110b and so on. In such a manner, all directional couplers 110 are in series with each other and in-line with transmission line 108.

Figure 2:
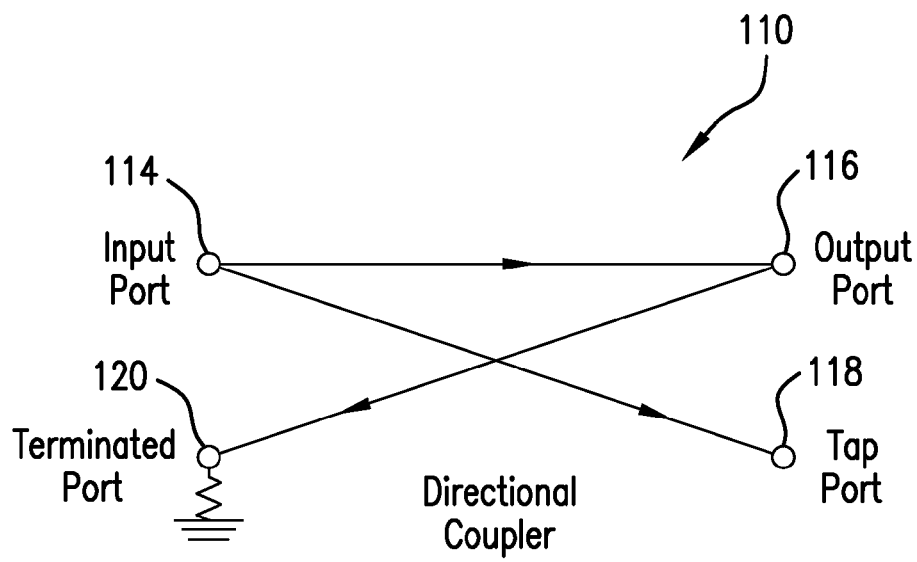
FIG. 2 shows a directional coupler from FIG. 1.

FIG. 2 shows directional coupler 110. Directional coupler 110 can be a four-port passive electronic device that provides different attenuation to signals between its ports. The four ports for directional coupler 110 are: an input port 114, an output port 116, a tap port 118, and a termination port 120. From input port 114, a constant impedance (Z) is seen by an electrical device. From output port 116, a constant impedance (Z) is seen by an electrical device. From tap port 118, a constant impedance (Z) is seen by an electrical device. The signal power loss from tap port 118 to the input port 114 (or reverse) is the coupling factor, which a fixed design factor that determines the ratio of the signal power split between the primary and secondary signals. The loss ratio from tap port 118 to the output port 116 (or reverse) is the isolation of directional coupler 110, which is typically 80:1 to 1000:1 (or any dBm loss ratio therebetween). That is to say that tap port 118 is isolated electrically from output port 116. The loss from output port 116 to input port 114 (or reverse) is a small value referred to as the "mainline loss".

The proposed system with base radio 102, transmission line 108, directional couplers 110, and antennas 106, all possess substantially the same impedance characteristic to form a "matched" system. A matched system has low voltage standing wave ratio and transducer loss, a necessary condition for a properly operated radio communications system.

Returning to FIG. 1, directional couplers 110 are shown coupled in line with transmission line 108 and in series with each other. In transmit mode from base radio 102, the signal is transmitted out antenna port 104 of base radio 102 across first transmission line portion 108a to input port 114 of first directional coupler 110a, a portion of the signal is directed to tap port 118 for broadcast from antenna 106a. The remaining portion of the signal is applied to output port 116 of first directional coupler 110a where it is sent across second transmission line portion 108b to input port 114 of second directional coupler 110b. A portion of the signal is directed to tap port 118 of second directional coupler 110b for broadcast from antenna 106b. The remaining portion of the signal is applied to output port 116 of second directional coupler 110b where it is sent across third transmission line portion 108c to input port 114 of third directional coupler 110c. A portion of the signal is directed to tap port 118 of third directional coupler 110c for broadcast from antenna 106c.

The amount of transmit power for antennas 106 will be progressively less at each tap port 118 the more distant tap port 118 is from base radio 102 in terms of the length of transmission line 108 and the number of directional couplers 110 through which the signal passes. A large number of directional couplers 110 (100 or more) may be installed in series with the transmission line 108 to provide signals to a large number of antennas 106, limited only by the radio frequency losses of transmission line 108 and directional couplers 110. A separate unidirectional or bidirectional amplifier between each tap port 118 and antenna 106 can be used to boost the power level of the signal to a useful level.

When receiving, a signal impinging on any one of the discrete antennas 106 connected to tap ports 114 in directional couplers 110 along transmission line 108 will be conveyed to base radio 102. Further, the signal power of the signals impinging on antennas 106 will be summed together and conveyed to base radio 102.

A negligible amount of the received signal will travel to the opposite end of the transmission line 108 because of the isolation inherent in directional coupler 110. The vast majority of the received signal is directed toward the base radio 102. The signal from any antenna 106 will be attenuated by the coupling factor loss of tap port 118 ($L_{CFL}$), loss in transmission line 108 from tap port 118 ($L_{TL1}$) to the base radio 102, and the mainline loss ($L_{ML1}$) of each directional coupler 110 that the signal passes through en route to base radio 102.

The signal attenuation from base radio 102 through transmission line 108 to, for example, the antenna 106c coupled to tap port 118 of directional coupler 110c is equal to:

Attenuation=(Mainline loss #1)+(Mainline loss #2)+ (Coupling factor loss #3)+(transmission line segment #1)+(transmission line segment #2)+(transmission line segment #3)+(coupling factor loss for directional coupler 110c)[should this be there?]=$L_{ML1}+L_{ML2}+L_{CFL}+L_{TL1}+L_{TL2}+L_{TL3}$ In a like manner, the total attenuation to any tap port 118 can be computed by summing the mainline losses and one coupling factor loss and the total coaxial transmission line loss to particular tap port 118.

Antennas 106 can be the same or different with each configured to transmit or receive on different frequencies. The radio system 100 can also be used to transmit and receive simultaneously via the antennas 106, assuming that the transmit and receive signals are on separate frequencies with suitable separation, and directional couplers 110 and antennas 106 have sufficient bandwidth to accommodate both frequencies.

Multiple antennas 106 fed along a single transmission line 108 will each have a specific phase due to time delay of the transmission line segments, and that phase relationship may cause peaks and nulls in signal intensity in coverage areas between adjacent antennas 106. The length of transmission line 108 between each antenna 106 may be adjusted to provide the desired additive phase relationship in a desired area of coverage between antennas 106.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations could be made herein without departing from the spirit and scope of the invention as embodied by the appended claims and their equivalents.

What is claimed is:

1. A radio system comprising:
   a base radio having an antenna port;
   a first transmission line portion coupled to the antenna port;
   a first directional coupler having an input port coupled with the first transmission line portion, an output port, and a tap port;
   a second transmission line portion coupled to the output port of the first directional coupler;
   a second directional coupler having an input port coupled to the second transmission line portion and a tap port;
   a first antenna connected to the tap port of the first directional coupler; and
   a second antenna connected to the tap port of the second directional coupler, wherein the first antenna and the second antenna are generally electrically isolated from each other, wherein the base radio in a transmit mode transmits a signal out the antenna port of the base radio across the first transmission line portion to the input port of the first directional coupler where a portion of the signal is communicated out the tap port of the first directional coupler and broadcast from the first antenna, and wherein the remaining portion of the signal is communicated out the output port of the first directional coupler across the second transmission line portion to the input port of the second directional coupler where another portion of the signal is communicated out the tap port of the second directional coupler and broadcast from the second antenna.

2. The radio system of claim 1, wherein the first directional coupler and the second directional coupler each have a loss ratio between the tap port and the output port of 100:1 or greater to electrically isolate the first antenna and the second antenna.

3. The radio system of claim 2, wherein the first antenna and the second antenna are separated from each other and from the base radio by one or more substantially radio opaque structures that limits communication with the base radio without the radio system of claim 1.

4. The radio system of claim 3, wherein the second directional coupler has an output port, and further comprising a plurality of directional couplers all connected in series with the second directional coupler in a same manner that the first directional coupler is coupled to the second directional coupler with a transmission line portion therebetween, wherein each of the plurality of directional couplers has an output port with an antenna connected thereto and each of such antennas are only communicatively coupled with the base radio and each of such antennas are separated from each other and from the base radio by the one or more substantially radio opaque structures that limits communication with the base radio without the radio system of claim 1.

5. The radio system of claim 1, wherein the first directional coupler restricts transfer of signal power from the first antenna to the second antenna.

6. The radio system of claim 5, wherein each of the first antenna and the second antenna signal powers are summed together and conveyed to the base radio with low loss.

7. The radio system of claim 1, wherein the first directional coupler is connected in series with the second directional coupler.

8. The radio system of claim 1, wherein the base radio in a receive mode receives at the antenna port a signal impinging on any one of the first antenna and the second antenna.

9. The radio system of claim 1, wherein a signal from the base radio that is broadcast from the second antenna is attenuated in an amount equal to a mainline loss across the first directional coupler plus a coupling factor loss of the tap port of the second directional coupler plus a loss in the first transmission line portion plus a loss in the second transmission line portion.

10. A method for establishing communication with a base radio in a structure, the method comprising
providing a base radio in a substantially radio-opaque structure;
installing a transmission line running from the base radio to two or more locations where direct communication with the base radio is substantially limited by the radio opaque structure;
installing in-line with the transmission line in each of the two or more locations a directional coupler having an input port connected to the transmission line and an output port connected to the transmission line and a tap port;
coupling to each tap port of the directional coupler an antenna for communicating with the base radio;
attenuating a signal from the base radio an amount equal to a mainline loss across a first directional coupler plus a coupling factor loss of the tap port of a second directional coupler plus a loss in a first transmission line portion of the transmission line plus a loss in a second transmission line portion of the transmission line; and
broadcasting the signal from the antenna coupled to the tap port of the second directional coupler.

11. The method of claim 10, and further comprising limiting with the directional coupler, communication between each antenna in the two or more locations.

12. The method of claim 11, and further comprising isolating the output port of the directional coupler from the tap port to limit direct communication between each antenna in the two or more locations.

13. The method of claim 10, and further comprising transmitting a signal out an antenna port of the base radio across the first transmission line portion to the input port of the first directional coupler where a portion of the signal is communicated out the tap port of the first directional coupler and broadcast from a first antenna, and wherein the remaining portion of the signal is communicated out the output port of the first directional coupler across the second transmission line portion to the input port of the second directional coupler where another portion of the signal is communicated out the tap port of the second directional coupler and broadcast from a second antenna.

14. The method of claim 10, receiving at an antenna port of the base radio a signal impinging on any one of a first antenna and a second antenna.

15. A radio system comprising:
a base radio for transmitting and receiving signals;
at least two antennas positioned apart from each other and separated from each other and the base radio by a substantially radio opaque structure;
a transmission line portion connecting the base radio to each of the at least two antennas for providing a path of travel for the signals; and
a directional coupler corresponding with each of the antennas, each directional coupler having an input port and an output port for positioning the directional coupler in line with the transmission line so that each directional coupler is directly coupled to each other by the transmission line and a tap port for connecting the directional coupler to the antenna, wherein a signal from the base radio that is broadcast from a second antenna of the at least two antennas is attenuated in an amount equal to a mainline loss across a first directional coupler plus a coupling factor loss of the tap port of a second directional coupler plus a loss in a first transmission line portion plus a loss in a second transmission line portion.

16. The radio system of claim 15, wherein each directional coupler has a loss ratio between the tap port and the output port of 100:1 or greater to electrically isolate each of the antennas.

17. The radio system of claim 15, wherein signal powers from each antenna are summed together and conveyed to the base radio with low loss.

18. The radio system of claim 15, wherein the base radio in a transmit mode transmits a signal out an antenna port of the base radio across a first transmission line portion to the input port of a first directional coupler where a portion of the signal is communicated out the tap port of the first directional coupler and broadcast from a first antenna of the at least two antennas, and wherein the remaining portion of the signal is communicated out the output port of the first directional coupler across a second transmission line portion to the input port of the second directional coupler where another portion of the signal is communicated out the tap port of the second directional coupler and broadcast from a second antenna of the at least two antennas.

19. The radio system of claim 15, wherein the base radio in a receive mode receives a signal impinging on any one of a first antenna of the at least two antennas and a second antenna of the at least two antennas.

* * * * *